Patented June 30, 1925.

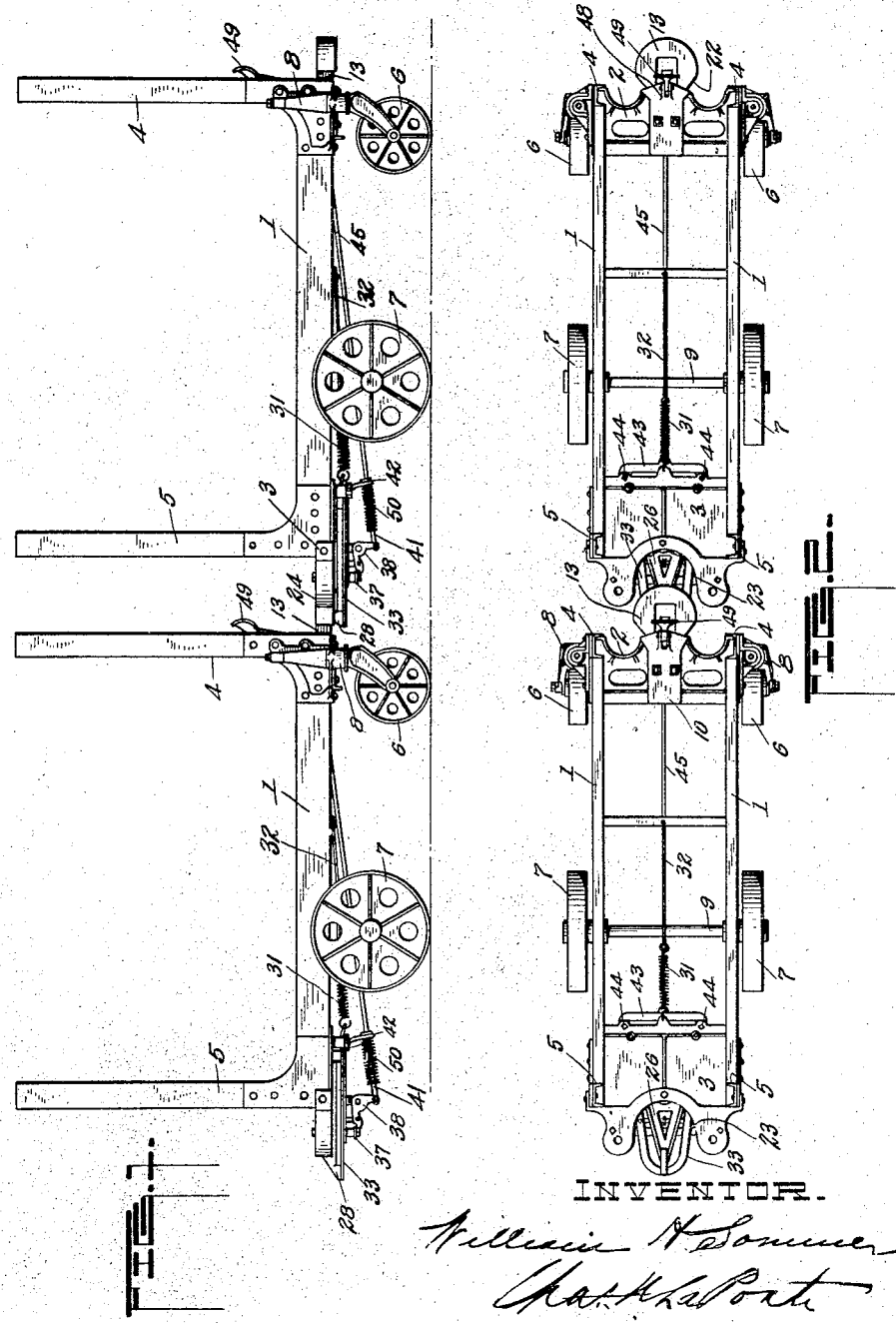

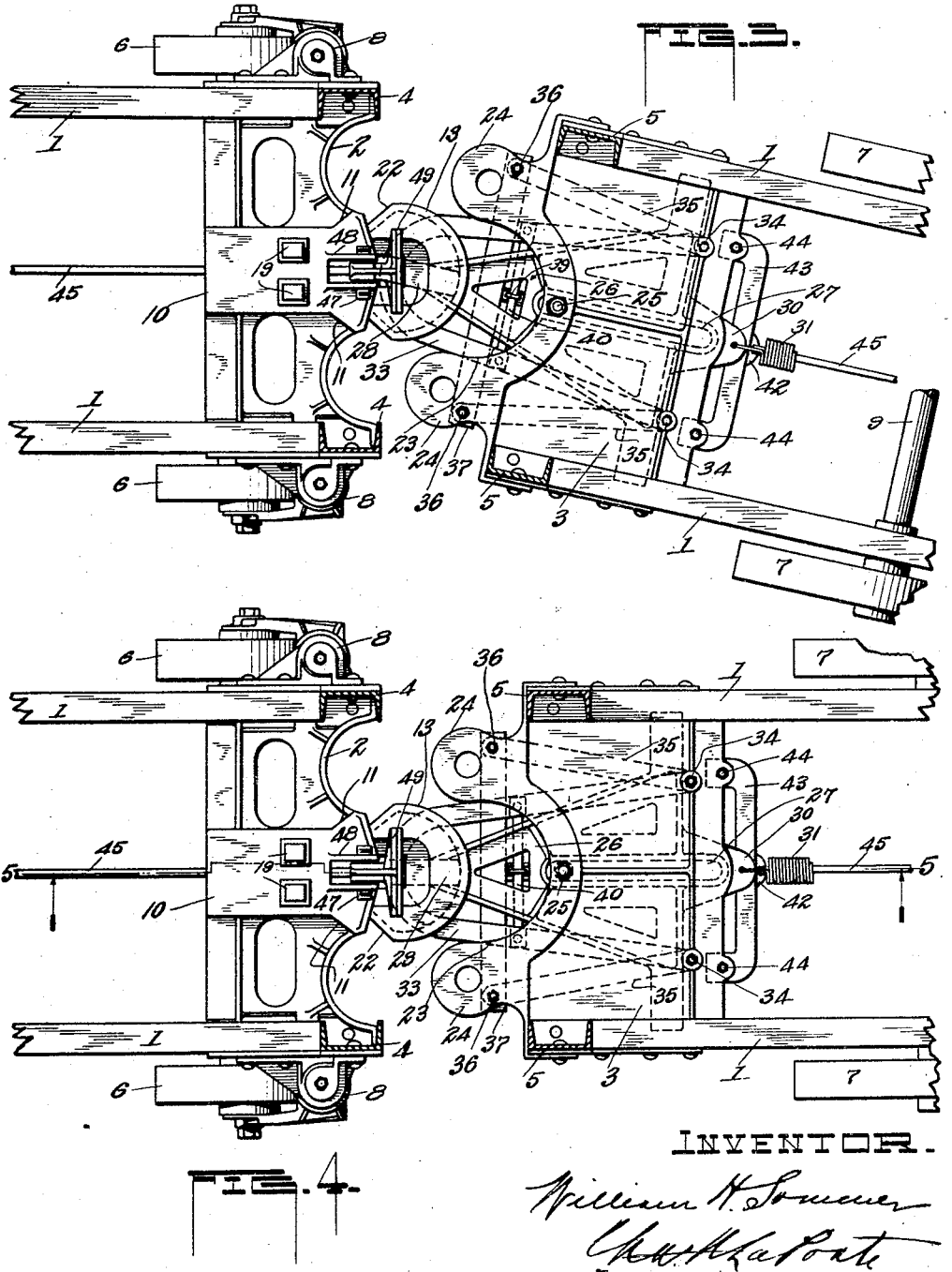

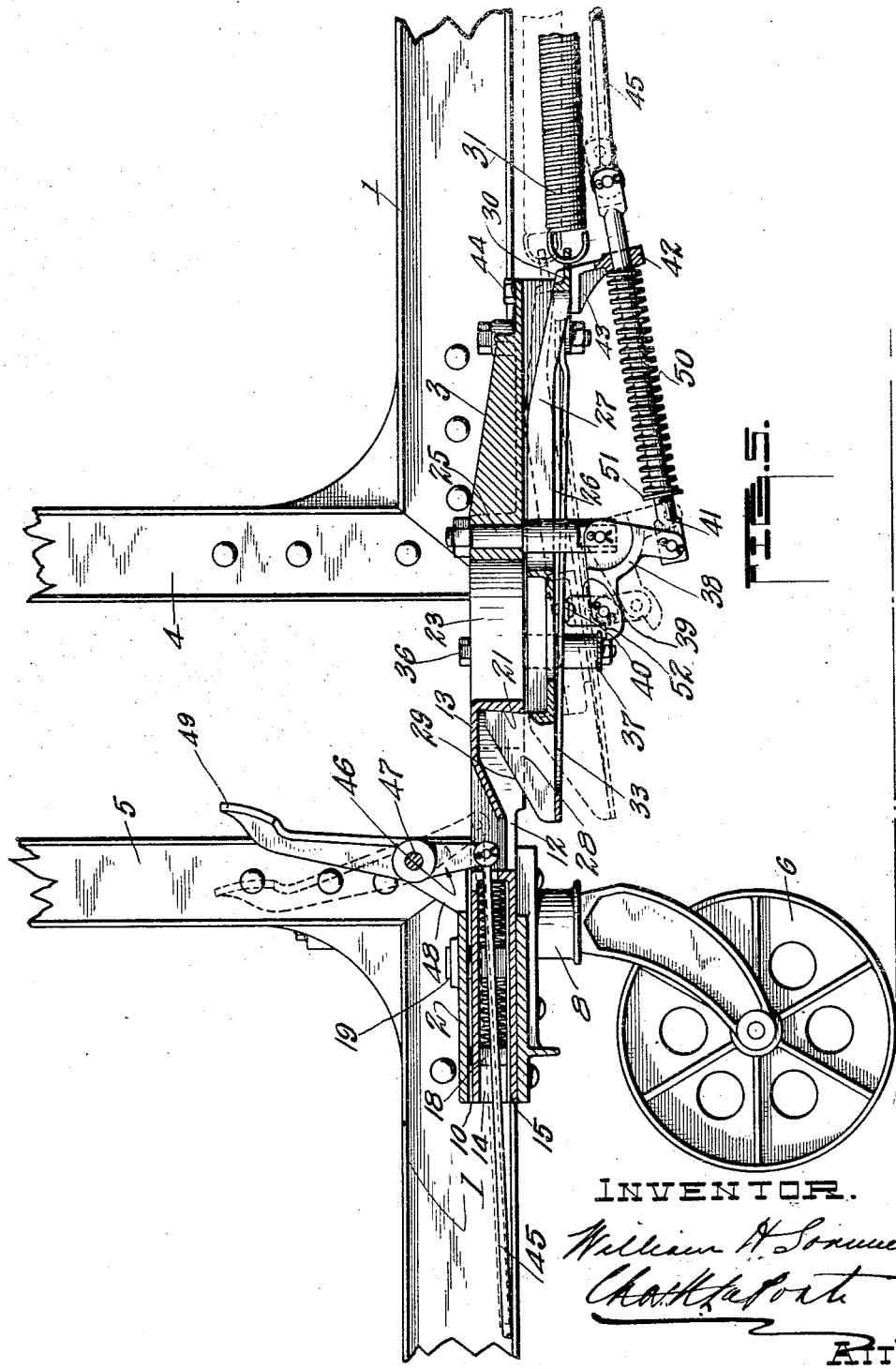

1,544,355

UNITED STATES PATENT OFFICE.

WILLIAM H. SOMMER, OF PEORIA, ILLINOIS.

AUTOMATIC COUPLER FOR INDUSTRIAL TRUCKS.

Application filed October 16, 1922. Serial No. 594,873.

*To all whom it may concern:*

Be it known that I, WILLIAM H. SOMMER, a citizen of the United States, residing at Peoria, in the county of Peoria and State of Illinois, have invented new and useful Improvements in Automatic Couplers for Industrial Trucks, of which the following is a specification.

This invention has reference to couplers and it relates particularly to couplers especially adapted for use in connection with industrial trucks.

Industrial plants, particularly where heavy materials are being manufactured are dispensing with the hand truck and substituting in lieu thereof motor driven trucks, and the tendency is toward the individual motive unit designed to be coupled to and adapted to draw one or more trucks therebehind, in the form of a train. One of the difficulties encountered with this form of hauling, particularly with inter-plant movements, is the coupling of the truck units which will allow for the coupling of the motive unit to a truck, and the coupling of the trucks to each other, whether or not the motive unit is in a direct line with the truck unit and the truck units in direct line with each other, or the individual units are at an angle to each other, excepting of course at angles near a right angle. In inter-plant movements with motive units and truck units of the character referred to there are no tracks, and therefore, it is desirable when the motive unit is backed up to a truck unit, and the latter are backed up to each other, that the coupling between the units shall be of a character which will permit easy and permanent coupling when the units are in direct line with each other or at angles thereto, and such couplings should be of such a resilient character that when the motive unit is started its momentum may be acquired before a direct pull is made upon the attached units, whereby stalling of the motive unit is practically avoided.

One of the objects of the present invention is to provide a wheeled truck capable of supporting and hauling heavy materials and which is provided with complementary coupling means at opposite ends; the coupling means at the front end being of a character adapted to have a coupling connection with a coupling means similar to that connected with the rear end of said truck.

The invention has for a further object to provide complementary coupling means for the front and rear ends of a truck unit, each including draw bars with complementary coupling ends resiliently supported to have longitudinal play when a direct pull is made upon the coupling members, and means being provided at the front end of the truck for releasing the coupling means at the rear end of the truck from the coupling means at the front end of the next adjacent and connected truck.

A further object of the invention is to provide a draw bar reciprocally supported and associated with shock and rebound springs and having a coupling end formed with a substantially semi-circular socket, and a connectible draw bar capable of longitudinal reciprocation and also oscillatory movement and having a coupling and arranged for connection with the socket of said first mentioned draw bar at different angles, means being provided to normally hold the connectible draw bar in coupling position, said connectible draw bar movable to uncoupled position upon the removal of the holding means therefrom.

That the invention may be more fully understood, reference is had to the accompanying drawings forming a part of this description, showing a preferred embodiment of the invention, in which:

Fig. 1 is a side elevation of two industrial truck units embodying my improved coupling mechanism, and the front and rear of the two trucks coupled together;

Fig. 2 is a plan view of the trucks and coupling mechanism shown in Fig. 1;

Fig. 3 is an enlarged plan view of the rear end of one truck and the front end of another both being coupled by my improved coupling mechanism, showing how the two truck units may be coupled when not in direct line with each other;

Fig. 4 is a view similar to Fig. 3, except that the truck units are in direct line with each other;

Fig. 5 is an enlarged vertical sectional view of the rear end of one truck and the front end of another the two being coupled together by my improved coupling mechanism the section appearing as if taken on the line 5—5 Fig. 4;

Figure 6:
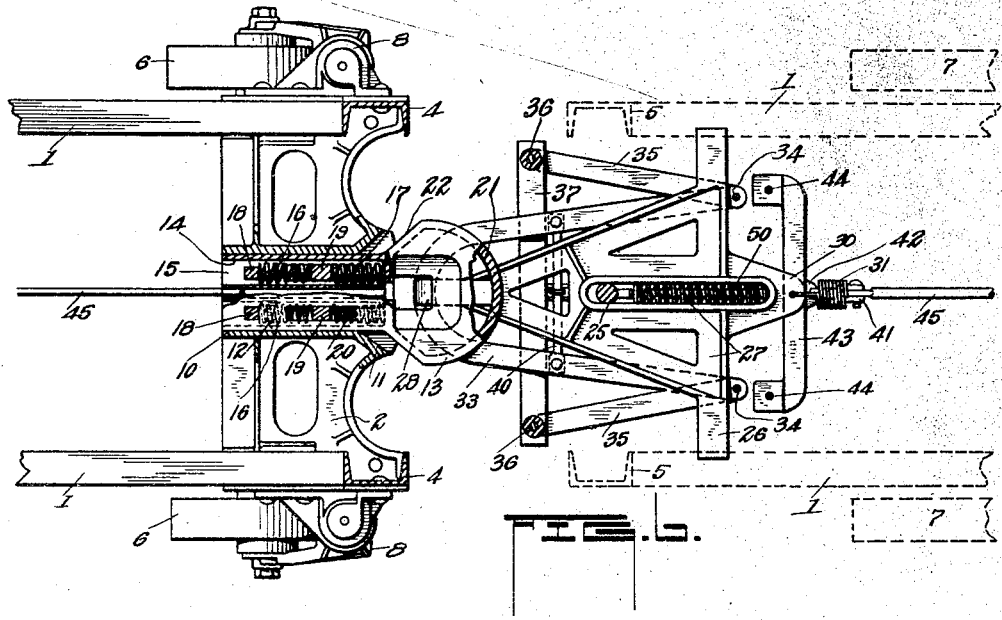
Figure 7:
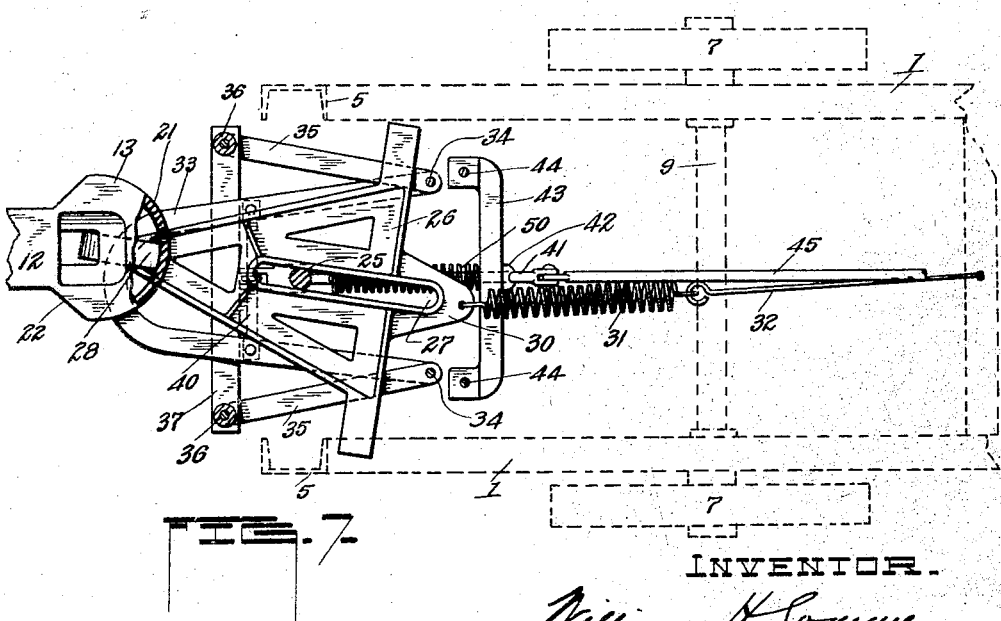

Fig. 6 is a detail in plan, partly in section, of the coupling means between two truck units showing the complementary elements at the rear of one truck and at the front of the other, the supporting casting at the rear end being omitted, and Fig. 7 is a view somewhat similar to Fig. 6 except that it illustrates the oscillatory movement of the draw bar of the coupling means on the rear end of the truck, illustrating how the parts may be out of direct line and yet become coupled.

Like characters of reference denote corresponding parts thruout the figures.

In describing the coupling mechanism it will be understood, that altho the motive unit is not shown it may be of any suitable character and preferably provided with a coupling means such as will be described connected with the rear end of a truck unit; and it will also be understood that each truck unit embodies complementary coupling means at its front and rear ends to adapt each unit to be coupled front and rear with other truck units embodying substantially the same coupling means at front and rear ends respectively. For the purpose of illustration the drawings show two truck units coupled at their front and rear ends respectively for the purpose of illustrating their connection with each other, the number of truck units in a train being limited only by the capacity of the motive unit for pulling or drawing the same and the description will be directed first to a complete truck unit, and second, to show how two or more may be coupled to each other, which operation will be substantially the same for the coupling of a motive unit to one or more truck units.

A truck includes preferably two longitudinal sills or beams 1, of suitable length and suitably spaced apart in parallel relation to each other; such sills or beams being connected at their front ends by a cross-frame or casting 2 and being connected at their rear ends by a cross-frame or casing 3; and connected with the front end of each sill or beam 1 and with the casting or cross-frame 2 are uprights or standards 4; and connected in a similar manner with the rear ends of the sills or beams 1 and with the frame or casting 3 are uprights or standards 5. The truck is preferably mounted on front and rear wheels 6 and 7, the former being castor wheels journaled in bearings 8 connected to the front ends of the sills 1 and the latter carried by a cross-shaft 9 journaled in suitable bearings beneath the sills or beams 1.

Reference now being had to the coupling means connected with the front end of a truck, the frame or casting 2 is provided midway its ends with a preferably rectangularly shaped open-ended housing 10 disposed longitudinally of the truck the opposite walls of which at the forward end being flared outwardly at 11, best seen in Fig. 6. In this housing is reciprocally arranged a draw bar 12 formed with an enlarged preferably semi-circularly shaped coupling head 13. The draw bar 12 is formed with a longitudinal chamber 14 the lower wall of which is provided with troughs 15 forming seats for two sets of springs 16 and 17, the former acting to take up the shock during the coupling operation, and the latter to take care of any rebound during such coupling operation. The springs 16 are held between blocks 18 in the rear end of the chamber 14 and blocks 19 which are carried thru slots 20 in the upper and lower walls of the draw bar and secured in the upper and lower walls of the housing 10 of the frame or casting 2; and the springs 17 are held between the blocks 19 and the forward end of the chamber 14 of the draw bar 12, see Fig. 6. It will be apparent that the draw bar may have longitudinal movement in the housing 10, the slots 20 permitting such movement with the blocks 19 projecting therethru. The coupling end 13 of the draw bar 12 is preferably provided with a semi-circular seat or socket 21 opening out of the lower side or face of said coupling, being adapted to receive a complementary coupling part of a coupling means attached to the rear end of a truck to be coupled thereto such complementary coupling being duplicated on the rear end of each truck, as will be described, such semi-circular seat enabling the connection thereto of such complementary coupling part when the truck to be connected is in a direct line therewith or at an angle thereto. The draw bar and its coupling are united by inclined or tapered walls 22 corresponding somewhat to the tapered ends 11 of the side walls of the housing 10, to allow for the endwise movement of the draw bar during a coupling operation, as is evidenced by the showing in Fig. 6.

Reference now being had to the coupling means connected to the rear end of the truck, the frame or casting 3 is shaped with a semi-circular end 23 terminating in the buffers 24 at either side thereof; such semi-circular end 23 serving as a seat or recess on the front of said casting to receive the similarly shaped coupling end 13 of the draw bar 12 should the coupling members be brought into close relation with each other. Extending thru and depending from said frame or casting 3 is a stem 25 to which is pivotally connected suitable actuating means and which also serves as a fulcrum member for a draw bar 26 provided with an elongated slot 27 thru which the stem 25 extends, see Figs. 5, 6 and 7. The draw bar 26 is an A-shaped frame the small end of which is formed with or has connected thereto a hook shaped coupling member 28 formed with an inclined or tapered surface 29, see Fig. 5. The rear end of the draw bar 26 is provided with an ear 30 to which is connected one end of a coil spring 31, the opposite end of which is connected to a rod 32 extending forwardly of the truck and connected to the frame of the truck. The draw bar 26 with its coupling end is supported for longitudinal and oscillatory movement as follows, which also permits the coupling end of the draw bar to be moved into and out of coupling engagement with the coupling end 13 of a draw bar 12 on the forward end of a truck; 33 designates a U-shaped frame preferably of spring steel, the arcuate end of which normally lies beneath and supports the coupling end 28 of the draw bar 26, see Figs. 5 and 6, while the opposite ends or terminals of said resilient frame are connected by means of bolts 34 to the casting or frame 3, such bolts also serving as the means for securing the forward ends of bars 35 on which rest the forward end of the draw bar 26, see Figs. 6 and 7, and said bars 35 extend rearwardly, diverging slightly and are connected to studs 36 secured to the frame or casting 3 and depending therefrom, as shown in Fig. 5 to the lower ends of which are connected a cross bar 37 which extends crosswise of and below the frame 33. As stated, normally the arcuate end of the frame 33 acts to hold the coupling end 28 of the draw bar 26 in a position such as shown in full lines in Fig. 5, the coupling end of said draw bar being adapted as the beveled tapered surface 29 engages the coupling end 13 of a draw bar 12 to be depressed so as to move into coupling position shown in Fig. 5. To release the coupling end 28 from the coupling end 13 there is provided a bell-crank lever 38 which is pivotally connected to the lower end of the stem 25, one end of said lever being pivotally connected to a link or arm 39 connected to and depending from a cross bar 40, see Figs. 5 and 6, which has its opposite ends connected to the resilient frame 33; the opposite end of said lever 38 being pivotally connected to a rod 41 which extends forwardly of the truck and passes thru a bearing 42 formed on a cross bar 43 secured by bolts 44 to the frame or casting 3, and the forward end of the said rod 41 has a pivotal connection with a rod 45 which extends forwardly of the truck and passing thru the central portion of chamber 14 of the draw bar 12 is connected with a crank 46 fulcrumed on a rod 47 journaled in suitable bearings 48. Connected to and extending up from the crank 46, of which it may be an extension, is an arm or lever 49 which may be actuated by hand or foot for reciprocating the rod 45 to oscillate the bell-crank lever 38 and move it from the full line position shown in Fig. 5 to the dotted line position in said figure. It will be apparent that when the bell-crank lever 38 is moved from the full line position shown in Fig. 5 to the dotted line position in such figure that the resilient frame 33 is drawn downwardly, its lowermost position being limited by the cross bar 37 with which it may engage, and when so lowered, or moved away from supporting position under the coupling end 28 of the draw bar 26, it will be obvious that the draw bar at its coupling end may fall away from coupling engagement with the coupling end 13 of a draw bar 12. Such action will compress a spring 50 coiled about the rod 41 and held between a collar 51 and the bearing 42 on the cross bar 43 which will act upon the release of the lever or arm 49 to return the parts to locking position, assisted by the spring action of the resilient frame 33 the tendency of which is to normally assume the position shown in full lines in Fig. 5. The bell-crank lever 38 is formed with an offset or shoulder 52 which is adapted as the parts move to coupling position to engage with the lower side of the cross bar 37 and limit or retard the return movement of the parts connected thereto.

One of the principal objects of the coupling mechanism herein shown and described is to provide an automatic safety coupler for trucks intended for use in industrial establishments. The trucks illustrated may be propelled by manual power if so desired, but are preferably designed for motor propulsion, and the coupling mechanism has been so designed that it will act quickly and efficiently and may be released without danger to an attendant being hurt during such coupling or uncoupling operations. In Fig. 5 it is readily seen how the complementary coupling members may be moved into coupling relation and how they may be released thru the actuation of the arm or lever 49. When the truck units are moved into coupling position the spring 16 as previously described will take up the shock due to the coupling operation, and the spring 17 will take care of any rebound. These springs together with the spring 31 connected with the draw bar 26 will allow sufficient play of the parts when a motive unit is coupled and is started to haul the truck units and until the motive unit is under momentum before a direct pull is imparted to the trucks. The draw bar 26 as shown, is not only capable of longitudinal movement, but may oscillate around the fulcrum pin 25 such movements being permitted by reason of the elongated slot 27. Such provision of slot whereby the point of fulcrum is changed on the draw bar 26 will permit the draw bar to assume either of the positions shown in Figs. 6 and 7 and at other angles corresponding thereto and a coupling connection with a coupling head 13 on a draw bar 12. This is particularly advantageous on account, as previously stated, the motive unit as well as the truck units may be backed into coupling relation with each other, in other than direct lines, and a successful coupling of the different units made.

What I claim is:—

1. An automatic coupler, including coacting coupling mechanisms, one of which includes a frame, a draw bar slidably connected with said frame and provided with a coupling head, resilient means for permitting limited longitudinal movement of said draw bar; the other of such mechanisms comprising a frame, a draw bar slidable on said frame and having a coupling head arranged for coupling engagement with said first mentioned head, resilient means for permitting limited longitudinal movement of said draw bar on said frame, means for supporting the coupling head of said draw bar in coupling position, and means for removing said supporting means from supporting position to permit the coupling end of said draw bar to drop out of coupling position.

2. An automatic coupler, including coacting coupling mechanisms, one of which includes a frame, a draw bar slidably connected with said frame and provided with a coupling head, resilient means for permitting limited longitudinal movement of said draw bar; the other of such mechanisms comprising a frame, a draw bar supported on said frame for both longitudinal and oscillatory movements and having a coupling head arranged for coupling engagement with said first mentioned head, resilient means for permitting limited longitudinal movement of said draw bar and for returning the latter to normal position when oscillated therefrom, means for supporting the coupling head of said draw bar in coupling position, and means for removing said supporting means from supporting position to permit the coupling end of said draw bar to drop out of coupling position.

3. An automatic coupler, including coacting coupling mechanisms, one of which includes a frame having an open-ended housing, a draw bar slidable in said housing and provided with a coupling head, means limiting the slidable movement of said draw bar; the other of such mechanisms comprising a frame, a draw bar supported beneath said frame adapted to have slidable and oscillatory movements and having a coupling head arranged for coupling engagement with said first mentioned head, means limiting the movement of said draw bar, a resilient member for supporting the coupling head of said draw bar in coupling position, a lever, and connections between said lever and said supporting member for moving the latter from supporting position to permit the coupling end of said draw bar to drop out of coupling position.

4. An automatic coupler, including coacting coupling mechanisms, one of which includes a frame, a draw bar slidably connected with said frame and provided with a coupling head having a semi-circular shaped socket opening out of its lower face, resilient means for permitting limited longitudinal movement of said draw bar; the other of such mechanisms comprising a frame, a draw bar slidable on said frame and having a shouldered coupling head arranged for connection in the socket of the head of said first mentioned draw bar, resilient means for permitting limited longitudinal movement of said draw bar, means for supporting the shouldered head of said draw bar in coupling position, and means for removing said supporting means from supporting position permitting said shouldered coupling end to drop out of coupling position.

5. An automatic coupler, including coacting mechanisms, one of which includes a frame, a draw bar slidably connected with said frame and provided with a coupling head having a semi-circular shaped socket opening out of the lower face thereof, resilient means for permitting limited longitudinal movement of said draw bar; the other of such mechanisms comprising a frame, a draw bar slidable on said frame and having a hook shaped coupling and arranged for coupling connection with the socket of said first mentioned draw bar, resilient means for permitting limited longitudinal movement of said draw bar, a resilient plate for supporting said hooked end of the draw bar in coupling position, a lever having connection with said resilient plate, manually operable means for actuating said lever to remove said resilient plate from supporting position to permit the hooked end of the draw bar to drop from coupling position, and means for automatically returning said lever and said resilient plate to supporting position.

6. A coupling mechanism for one end of an industrial truck, comprising a frame provided with an open-ended housing, a draw bar slidable in said housing, means permitting limited longitudinal movement of said draw bar, and a coupling end for said draw bar formed with a semi-circular socket opening only out of the lower face thereof.

7. A coupling mechanism for one end of an industrial truck, comprising a frame provided with an open-ended housing, a chambered draw bar slidable in said housing and having a coupling end, opposite walls of said chambered draw bar provided with longitudinal slots, means connected with the walls of the housing and passing thru said slots, and springs within the chambered draw bar and engaging the same and said means inserted thru the slots thereof to take up the shock and the rebound during the coupling movement of the draw bar.

8. A coupling mechanism for one end of an industrial truck, comprising a frame, a draw bar supported therebeneath and adapted to have limited longitudinal movement, said draw bar provided with an elongated slot, a fulcrum member on said frame and passing thru the slot of the draw bar to permit the latter to have oscillatory movement during its longitudinal movement, a coupling end for said draw bar, means for supporting the coupling end of the coupling draw bar in coupling position, and means for moving said supporting means away from the coupling end of the draw bar to permit the same to drop away from coupling position.

9. A coupling mechanism for one end of an industrial truck, comprising a frame, a draw bar disposed therebeneath and supported for longitudinal as well as oscillatory movements, a hooked coupling end for said draw bar, a spring plate for supporting the coupling end of said draw bar in coupling position, a bell-crank lever, connections between said bell-crank lever and said spring plate, means for manually actuating said bell-crank lever to move the spring plate from supporting position to permit the hooked end of the draw bar to drop from coupling position, and spring means to return the lever and spring plate to supporting position.

10. A coupling mechanism for the front and rear ends of industrial trucks each having means complementary to the other whereby trucks may be connected in train; the mechanism for one end of the truck including a draw bar having a coupling and provided with a semi-circular shaped socket opening out of the face thereof, resilient means for permitting limited longitudinal movement of said draw bar; the mechanism for the opposite end of the truck including a draw bar having a hooked end adapted to have connection with a draw bar having a socket similar to that first above mentioned, resilient means for permitting limited longitudinal movement of said draw bar, means for supporting the hooked end of said draw bar in coupling position, a lever associated with the coupling mechanism for the front end of the truck, and operating connections between said lever and said draw bar supporting means for moving the latter out of supporting position to permit the draw bar to drop out of coupling position.

11. A coupling mechanism for the front and rear ends of industrial trucks each having means complementary to the other whereby trucks may be connected in train; the mechanism for one end of the truck including a draw bar having a coupling end, resilient means for permitting longitudinal movement of said draw bar; the mechanism for the opposite end of the truck including a draw bar having a coupling end, resilient means for permitting longitudinal movement of said draw bar, means for supporting said draw bar in coupling position, means associated with the first mentioned coupling mechanism for operating said draw bar supporting means, and connections between said operating means and said draw bar supporting means for moving the latter out of supporting position to permit the draw bar to drop out of coupling position.

12. A coupling mechanism for the front and rear ends of industrial trucks each having means complementary to the other whereby trucks may be connected in train; the mechanism for one end of the truck including a draw bar having a coupling end, resilient means for permitting longitudinal movement of said draw bar; the mechanism for the opposite end of the truck including a draw bar having a coupling end, resilient means for permitting longitudinal movement of said draw bar, means for supporting said draw bar in coupling position, means associated with the first mentioned coupling mechanism for operating said draw bar supporting means, and spring means for returning the draw bar supporting means to supporting position.

13. A coupling mechanism for the front and rear ends of industrial trucks each having means complementary to the other whereby trucks may be connected in train; the mechanism for one end of the truck including a draw bar having a coupling end, resilient means for permitting longitudinal movement of said draw bar; a mechanism for the opposite end of the truck including a draw bar having a coupling end, resilient means for permitting limited longitudinal movement of said draw bar, a resilient plate adapted to support said draw bar in supporting position, a bell-crank lever, a connection between said bell-crank lever and said supporting plate, a lever associated with said first mentioned coupling mechanism, operating connections between said lever and said bell-crank lever, and spring means associated with said operating connections for returning the bell-crank lever and supporting plate to supporting position.

14. A coupling mechanism comprising a draw bar having a coupling end and a longitudinal slot, a vertical fulcrum pin extending through the slot, spring means urging the draw bar inwardly, and a vertically movable support for the latter over which the draw bar is movable in a horizontal plane about the fulcrum pin.

15. A coupling mechanism comprising a draw bar having a coupling end and a longitudinal slot, a vertical fulcrum pin extending through the slot, spring means urging the draw bar inwardly, a vertically movable resilient support for the draw bar supporting the latter for movement thereover in a horizontal plane, and means for withdrawing the support from under the draw bar.

WILLIAM H. SOMMER.